United States Patent [19]

Brizzolesi et al.

[11] Patent Number: 4,905,955
[45] Date of Patent: Mar. 6, 1990

[54] DAMPING SUPPORT FOR THE SUSPENSION OF AN OSCILLATING BODY ON A SUPPORT STRUCTURE, PARTICULARLY FOR THE SUSPENSION OF THE ENGINE ON THE CHASSIS OF A MOTOR VEHICLE

[75] Inventors: Gustavo Brizzolesi, Chieri; Mario Perino, Candiolo, both of Italy

[73] Assignee: Ages S.p.A., Turin, Italy

[21] Appl. No.: 216,043

[22] Filed: Jul. 7, 1988

[30] Foreign Application Priority Data

Jul. 7, 1987 [IT] Italy .............................. 67585 A/87

[51] Int. Cl.⁴ ............................................. F16F 13/00
[52] U.S. Cl. .................................... 248/562; 248/636; 267/140.1
[58] Field of Search ............... 248/562, 636, 638, 659; 267/140.1

[56] References Cited

U.S. PATENT DOCUMENTS

| | | | |
|---|---|---|---|
| 4,621,795 | 11/1986 | Ebenhard et al. | 248/562 X |
| 4,641,808 | 2/1987 | Flowers | 248/562 X |
| 4,645,188 | 2/1987 | Jordens | 248/562 X |
| 4,712,777 | 12/1987 | Miller | 267/140.1 |
| 4,721,288 | 1/1988 | Andra et al. | 248/562 X |
| 4,730,584 | 3/1988 | Jordens et al. | 248/636 X |
| 4,754,956 | 7/1988 | Banone et al. | 248/562 X |

Primary Examiner—Alvin C. Chin-Shue
Attorney, Agent, or Firm—Sughrue, Mion, Zinn, Macpeak & Seas

[57] ABSTRACT

A damping support, which is particularly intended for reciprocating engines of motor vehicles, comprises a tubular support body intended for fixing to a support structure and closed at one end so as to define a chamber containing a damping liquid, an attachment member intended for fixing to an oscillating member and connected coaxially to the other end of the tubular support body by an annular element of elastomeric material, a transverse disc member connected to the attachment member and immersed in the damping liquid and having holes for the passage of the liquid, and an oburator associated with the disc for varying the area for passage of the liquid through the holes. In particular, the support enables a reduction of the high-frequency vibrations over a wide frequency range.

5 Claims, 2 Drawing Sheets

DAMPING SUPPORT FOR THE SUSPENSION OF AN OSCILLATING BODY ON A SUPPORT STRUCTURE, PARTICULARLY FOR THE SUSPENSION OF THE ENGINE ON THE CHASSIS OF A MOTOR VEHICLE

BACKGROUND OF THE INVENTION

The present invention relates to a damping support for the suspension of an oscillating body on a support structure, and is particularly intended for reciprocating engines for motor vehicles.

The invention particularly concerns a damping support of the type comprising:
- a tubular support body which is intended to be fixed to the support structure and is closed at one end so as to define a chamber containing a damping liquid,
- an attachment member which is intended to be fixed to the oscillating member and is connected coaxially to the other end of the tubular support body by means of an annular element of elastomeric material whose outer surface is fixed to the tubular support body and whose inner surface is fixed to the attachment member, and
- fluido-dynamic means for damping the oscillations of the attachment member relative to the tubular body, including a transverse disc member connected to the attachment member and immersed in the damping liquid.

Damping supports of the aforementioned type are suitable for damping large-amplitude, low-frequency oscillations, such as, for example, the oscillations of a motor vehicle engine under slow running conditions or in the event of sudden jolts to the vehicle caused by uneven ground. This type of support has disadvantages, however, in the case of low-amplitude, high-frequency vibrations, such as those which occur when the engine is running at high speeds of revolution, since it has a high dynamic rigidity which is further increased as the frequency of the vibrations increases whereby large pressure variations are transmitted as vibrations to the chassis of the motor vehicle to the detriment of the comfort of the ride.

A damping support of the type specified above is also known which further includes a transverse wall dividing the inner chamber into two chambers which communicate with each other through a restricted-passage duct for the damping liquid.

In this case, the support enables a low dynamic rigidity value to be obtained with high-frequency disturbances; in particular, the trace of the dynamic rigidity value as a function of the frequency of oscillation has its minimum in a certain frequency range at which the value of the dynamic rigidity is less than that of the static rigidity.

SUMMARY OF THE INVENTION

The object of the present invention is to produce an improved damping support which enables a dynamic rigidity value lower than the static rigidity value to be obtained for a wide range of frequencies, particularly in the high-frequency region, thus reducing the high-frequency vibrations transmitted to the support structure.

This object is achieved by virtue of a damping support of the type mentioned in the introduction to the present description, whose main characteristic lies in the fact that the disc member is provided with at least one aperture for the passage of the damping liquid and movable obturator means associated with the disc are provided for varying the area for passage of the damping fluid through the at least one aperture.

BRIEF DESCRIPTION OF THE DRAWINGS

Further characteristics and advantages of the present invention will become clear from the detailed description which follows with reference to the appended drawings, provided by way of non-limiting example, in which.

DETAILED DESCRIPTION OF THE INVENTION

Figure 1:
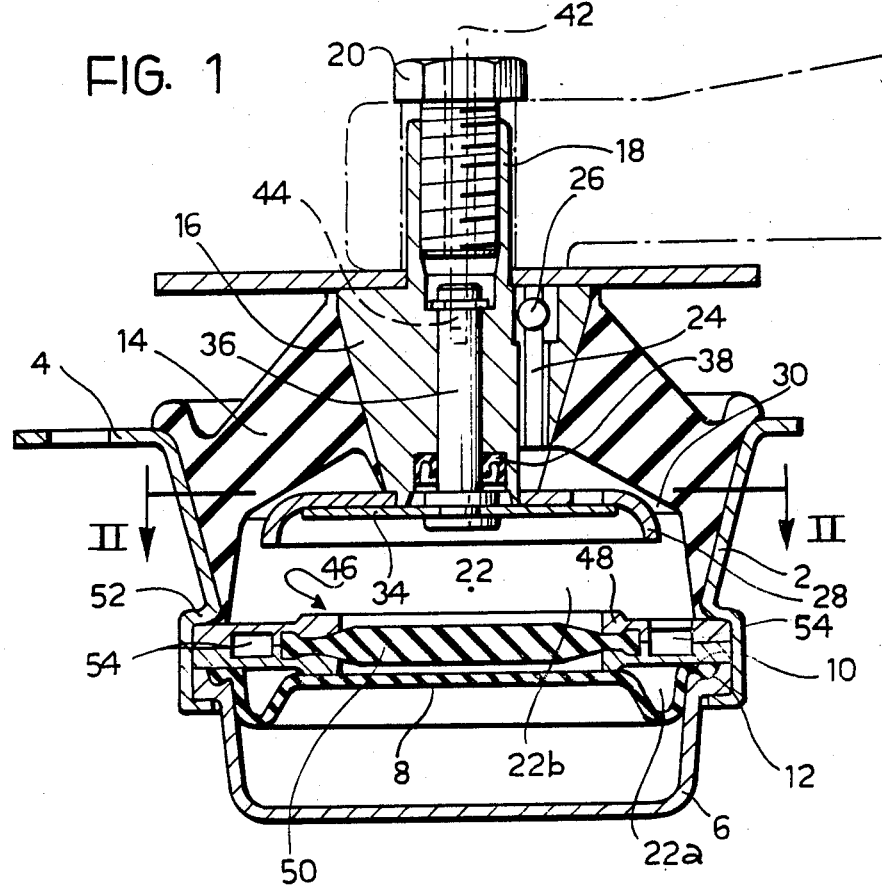
FIG. 1 is an axial section of a damping support, particularly for a supported power unit.
Figure 2:
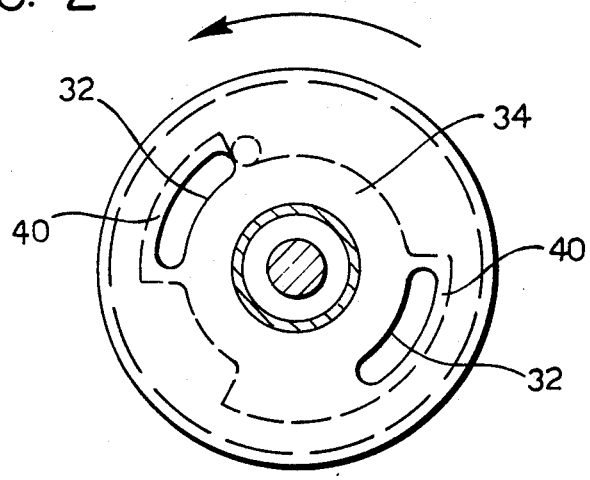
FIG. 2 is a partially sectioned view taken on the line II—II of FIG. 1.

With reference to FIGS. 1 and 2, a tubular metal support body is indicated 2 and is provided at one end with an annular flange 4 for fixing it to the chassis of a motor vehicle. The tubular body 2 is closed at one end by means of a protective metal cover 6 which acts as a support for a flexible diaphragm 8 of elastomeric material whose peripheral edge has an annular flange 10 with a rib which engages a complementary groove in the cover 6.

At the other end of the tubular body 2 is fixed an essentially bell-shaped annular element of elastomeric material 14 whose radially outer surface is fixed to the inner surface of the tubular body 2. The radially inner surface of the annular element 14 is fixed to a metal attachment member 16 constituted by a bush having a substantially frusto-conical profile. The attachment member 16 is provided at its outer end with a shank 18 having an internally threaded hole for the engagement of a corresponding threaded attachment element 20 fixed to the engine of the vehicle.

The tubular body 2, the diaphragm 8 and the annular element 14 define within the support a chamber 22 which is intended to be filled with a damping liquid introduced through a through-hole 24 with a ball valve 26, formed in the attachment member 16.

A transverse disc 28 is rigidly connected to the attachment member 16 and has a flat base surface and arcuate peripheral edges. The disc 28 extends tranversely in the chamber 22 to define an annular passage 30 between its radially outer surface and the radially inner surface of the tubular body, through which the damping liquid can flow. The disc 28 has two slot-shaped apertures 32 which extend circumferentially and are essentially symmetrical with respect to a diametral axis.

According to the invention, the disc 28 has an associated obturator disc 34 with flat surfaces, mounted in contact with the axially inner surface of the disc and able to interfere with the area of passage through the apertures 32. The obturator disc 34 is supported and rotated by a shaft 36 which is rotatable in an axial hole of the attachment member 16.

Figure 4:
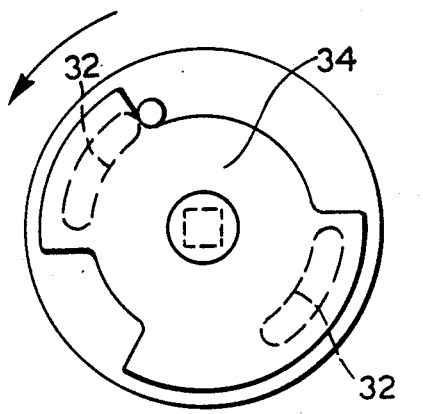
FIG. 4 is a partially sectioned view taken on the line IV—IV of FIG. 3.

In the embodiment illustrated in FIGS. 2 and 4, the obturator disc 34 is substantially circular in shape and has two radial projections 40 for varying the area for passage of liquid through the apertures 32 as a result of the rotation of the disc from a position in which the apertures are both completely closed to a position in which they are both completely open.

The shaft 36 fixed to the obturator 34 is intended to be rotated by means of a flexible shaft 42 passing through an axial hole of the threaded attachment element 20 and having an end 44 connected to the shaft 36.

The damping support further includes a divider unit, generally indicated 46, which is constituted by a rigid annular element 48 of plastics material or aluminium, supporting a disc 50 of elastomeric material. The annular element 48 is fixed to the inner surface of the tubular body, with its peripheral edge interposed between the peripheral edge of the cover 6 and a shoulder 52 of the tubular body. The divider unit 46 divides the chamber 22 into two chambers 22a and 22b which are in liquid communication through a generally helical restricted-passage duct 54 formed in the annular element 48. The passage of liquid between the chambers 22a and 22b through the restricted duct 54 has a further damping effect on the oscillations. The liquid intended to be introduced into the chamber 22 typically has a low viscosity value and is preferably constituted by a mixture of water and glycol.

The support according to the invention enables the dynamic rigidity value Kd to be regulated in dependence on the frequency of oscillation of the engine. For this purpose, a control and processing unit processes a signal which depends, for example, on the speed or rate of revolution of the engine and provides a command for the rotation of the obturator 34 by the flexible transmission shaft 42 and the shaft 36 to position the obturator in an angular position in which the area for passage of the damping liquid has a predetermined value corresponding to the required dynamic rigidity value.

It is thus possible to obtain a dynamic rigidity value which is less than that of the static rigidity for a wide range of high frequencies, enabling the elimination of vibrations transmitted to the structure of the motor vehicle at disturbance frequencies.

Figure 5:
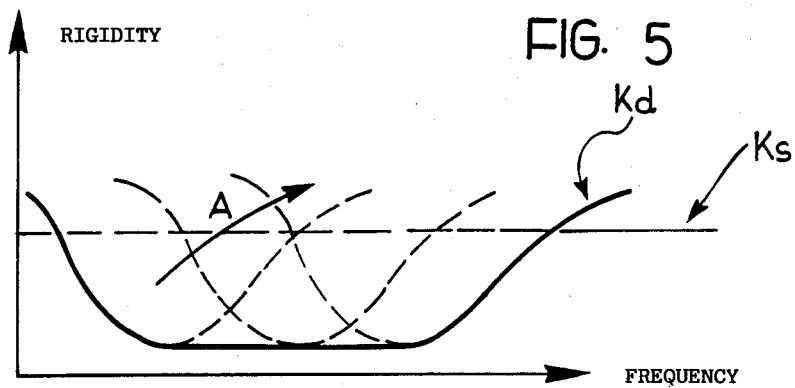
FIG. 5 is a graph which shows the trace of dynamic rigidity as a function of frequency for a damping support according to the invention.

In FIG. 5, the traces of the dynamic rigidity for different values of the area A for passage of the damping liquid through the apertures of the disc are illustrated by broken lines. As the area of passage through the apertures increases, the minimum value of each curve is displaced towards higher frequency values. The continuous line in FIG. 5 shows the trace of the dynamic rigidity curve obtainable by means of the support according to the invention, which results from the envelope of dynamic rigidity curves for the individual values of the passage area A. The chain line shows, by way of example, the trace of the static rigidity Ks.

Figure 3:
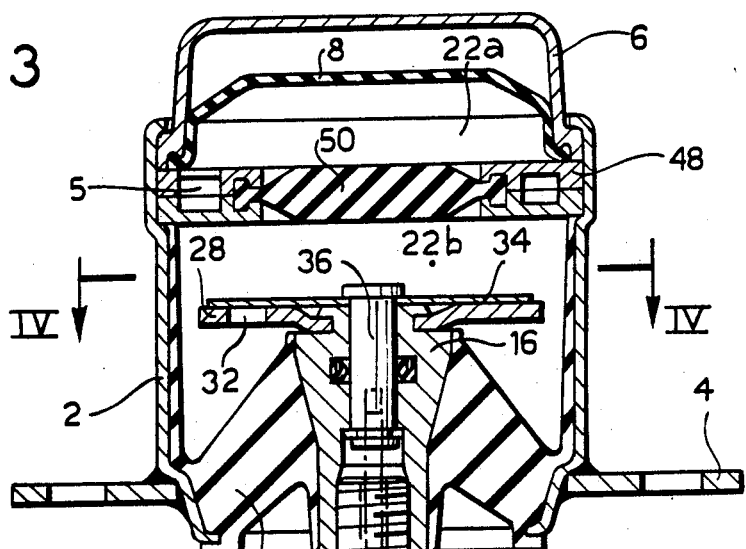
FIG. 3 is an axial section of one embodiment of a damping support suitable for a suspended power unit.

FIG. 3 shows an embodiment of the engine support for suspended power units. The structural characteristics of this embodiment differ from that illustrated in FIG. 1 only in details of shape which do not affect the functional behaviour of the support; the elements of FIG. 3 which correspond to the elements of FIG. 2 are therefore numbered with the same reference numerals.

Naturally, the principle of the invention remaining the same, the forms of embodiment and details of construction may be varied widely with respect to those described and illustrated purely by way of non-limiting example. Thus, for example, the support could be provided with a motor incorporated in the attachment member for rotating the obturator.

We claim:

1. A damping support for the suspension of an oscillating body on a support structure, comprising:
    a tubular support body which is intended to be fixed to the support structure and is closed at one end so as to define a chamber for containing a damping liquid,
    an attachment member which is intended to be fixed to the oscillating member and is connected coaxially to the other end of the tubular support body,
    an annular element of elastomeric material whose outer surface is fixed to the tubular support body and whose inner surface is fixed to the attachment member to effect the coaxial connection of the attachment member to the other end of the tubular support body, and
    fluido-dynamic means for damping the oscillations of the attachment member relative to the tubular support body, including a transverse disc member rigidly connected to the attachment member and intended to be immersed in the damping liquid,
    wherein the disc member defines at least one aperture for the passage of the damping liquid and obturator means are associated with the disc for varying the area for passage of the damping liquid through the at least one aperture.

2. A damping support according to claim 1, wherein the obturator means comprise a rotary disc situated in contact with the surface of the transverse disc and having surface portions which can interfere with the passage area of the at least one aperture as a result of its angular rotation, the attachment member carrying a shaft for rotating the disc.

3. A damping support according to claim 1, wherein the said one end of the tubular body is closed by a flexible diaphragm constituting a wall of the chamber.

4. A damping support according to claim 1, wherein it further includes a divider unit in the form of a transverse wall supported sealingly by the walls of the tubular body and defining first and second chambers within the said chamber, the divider unit also defining a restricted-passage duct through which the first and second chambers are in liquid communication with each other.

5. A damping support according to claim 4, wherein the divider unit comprises a rigid annular element defining said restricted-passage duct for the damping liquid and having a radially inner wall, and a disc member of elastomeric material supported by said inner wall.

* * * * *